Feb. 25, 1969 R. B. HANSEN 3,429,988

DUAL PENTODE DEMODULATOR FOR THREE COLOR TELEVISION SIGNALS

Original Filed Nov. 15, 1963

INVENTOR.
Robert B. Hansen

BY

Mueller & Aichele

Attys.

United States Patent Office 3,429,988

Patented Feb. 25, 1969

3,429,988

DUAL PENTODE DEMODULATOR FOR THREE COLOR TELEVISION SIGNALS

Robert B. Hansen, Arlington Heights, Ill., assignor to Motorola, Inc., Chicago, Ill., a corporation of Illinois Continuation of application Ser. No. 323,976, Nov. 15, 1963. This application Oct. 10, 1966, Ser. No. 585,700
U.S. Cl. 178—5.4 3 Claims
Int. Cl. H04n 5/44

Figures 1, 2:
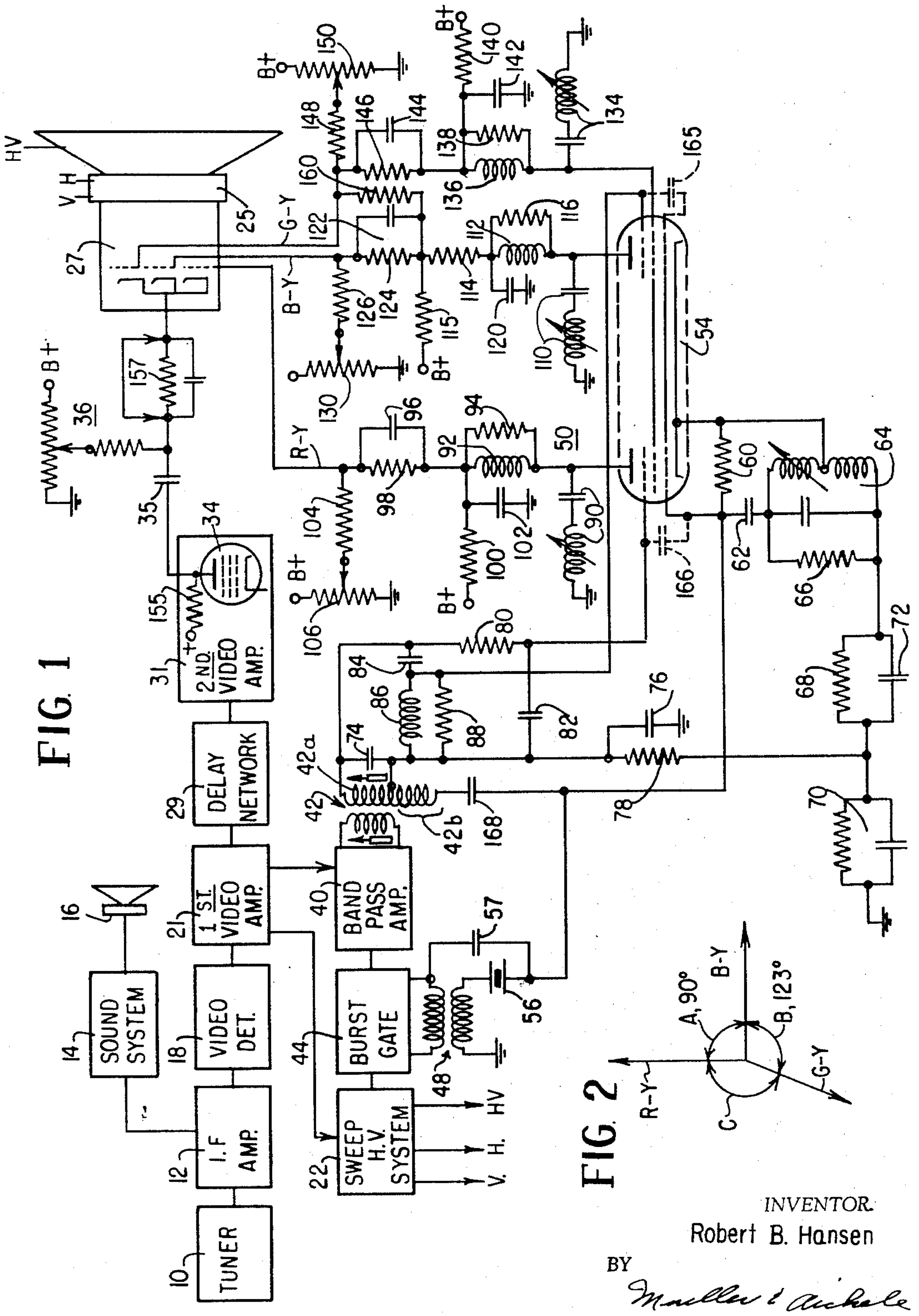

This application is a continuation of application Ser. No. 323,976, filed Nov. 15, 1963, and now abandoned.

This invention relates to television receivers and more particularly to a demodulator system for color television signals.

The usual television receiver utilizes a composite program signal having a carrier which is amplitude modulated by brightness or luminance components, as well as by horizontal and vertical synchronizing pulses for properly timing the scanning of the reproduced image. This composite signal also includes chroma information in the form of amplitude and phase modulation of a suppressed subcarrier. A reference for the demodulation of the chroma signal is provided by a few cycles of a color reference burst signal transmitted along with each horizontal synchronizing pulse, so that a reference oscillator in the receiver can be phase controlled with respect to the transmitter color reference to insure accurate color signal demodulation. Color information is demodulated at different phase angles with respect to the color reference signal and the demodulated signals represent three primary color difference signals ($R-Y$, $B-Y$, $G-Y$) which are utilized, together with a luminance signal (Y) to energize a tri-beam cathode ray tube for producing an image with proper brightness, color hue, and color saturation.

Various types of color signal demodulator systems are known for deriving the color information in a system of the above type. For example, the chroma information can be demodulated at two different phase angles and then the two demodulated signals can be matrixed to produce the three color difference signals. It is possible to demodulate the $R-Y$ and $B-Y$ signals (that is, the red and blue color difference signals) directly, so that these are usable in the image reproducing tube without further phase shift of the signals. In such a case the $G-Y$, or green color difference signal, is commonly produced in a multi-resistor matrix which utilizes phase reversed combinations of the red and blue color difference signals. Such a system raises the problem of producing signals having a sufficient amplitude for driving the cathode ray tube since there will be signal losses in a resistor matrix. Compensating for such losses through the use of a color difference amplifier obviously adds undesirable cost to a receiver.

An object of the present invention is to do away with a resistor matrix network for obtaining the $G-Y$ signal upon detection of the $R-Y$ and $B-Y$ signals, and to recover the $G-Y$ signal through "electronic" means within the demodulator tube, with the attendant advantage of maintaining improved signal strength of the $G-Y$ signal as well as the $B-Y$ and $R-Y$ signals.

It has also been proposed to demodulate the red and blue color difference signals in an oscillating demodulator wherein the function of producing local oscillations to be phased locked by the reference burst signal, and the demodulation function for two color difference signals are all combined into one electron amplifier device. Here again, however, the production of the proper green color difference signal has required amplification and undesirable matrixing circuitry.

Accordingly, a further object is to obtain the red, blue and green color difference signals directly from an oscillating demodulator with the proper phase angle among these three color difference signals so that a cathode ray tube can be driven directly without further amplification of the signals or use of a resistor network for matrixing purposes.

Still another object is to maintain desirable stability and locking response in a color reference oscillator operable in a combined oscillator, amplifier, and detector for directly producing red, blue and green color difference signals from modulated chroma signal components and reference burst synchronizing signals.

A more general object is to simplify and reduce the cost of a color signal demodulation system by combining a number of detector functions into one electron tube.

In a specific form of the demodulator system of the invention, a common cathode, control grid, and screen grid of a two section pentode vacuum tube are connected in an oscillator circuit operative at the frequency of the color reference signal, namely 3.58 megacycles. A suitable burst gate system provides a reference burst signal to the oscillator for phase locking its signal to the suppressed color carrier of the received program signal. The vacuum tube further includes separate demodulator grids to which are applied the chroma modulation information by way of separate phase shift networks. The red and blue color difference signals are derived at load impedances connected to separate anodes of the tube which are associated with respective ones of the demodulator grids. A load impedance is also connected to the screen grid of the tube for developing the green color difference signal as a phase reversed vector sum of the red and blue difference signals. The phase shift networks supplying the modulated chroma information to the tube are selected with parts values so that the applied signals have amplitudes and phases at the demodulator grids to produce all three of the color difference signals at the proper phase angles for directly driving a cathode ray tube without further demodulating, all as a result of effective matrixing action within the tube itself. In this way the phase angles of the color difference signals are established without the use of matrixing normally associated with a system of the described type. Should it be necessary to make any further adjustment in the amplitudes of any one of the color difference signals available at the anodes of the demodulator tube in order to properly drive a color picture tube of a given type, such amplitude adjustment can be affected by selection of the value of the load impedance for the demodulator anode circuit and/or achievement of some amplitude balance among the signals in the luminance signal path provided at the cathode of the color picture tube. Accordingly, it may be seen that a single vacuum tube can provide the functions of an injection locked oscillator for the color reference signal, direct demodulation of red, blue and green color difference signals, and amplification of the color difference signals, permitting the attainment of several further advantages which will be explained in connection with the detailed description of the operation of the system.

In the drawing,

FIG. 1 is a diagram, partly schematic and partly in block, which shows a color television receiver in accordance with the invention; and FIG. 2 is a vector diagram helpful in understanding the operation of the circuit of FIG. 1.

The color television receiver of FIG. 1 includes a tuner 10 for selecting a television program signal and converting this signal to one of intermediate frequency for further amplification in the IF amplifier 12. The sound subcarrier of the received signal is coupled to the sound system 14 to be demodulated and amplified for driving the loudspeaker 16.

A video detector 18 is connected to the IF amplifier 12 for demodulating the video portions of the received signal to produce luminance signal components (Y), synchronizing signal components, color reference burst signals (which are transmitted in association with the horizontal synchronizing components) and modulation information representing the chrominance signal. These signal components are applied to the first video amplifier 21. The vertical and horizontal synchronizing components are coupled to the sweep and high voltage system 22 which, in accordance with the usual practice, provides high voltage and sawtooth sweep signals at the vertical and horizontal deflection frequencies (60 cycles per second and 15.75 kc, respectively) for energizing the magnetic deflection yoke 25 on the neck of the tri-beam cathode ray picture tube 27.

Luminance components of the demodulated signal are coupled through the delay network 29 from the video amplifier 21 to the further video amplifier 31. The network 29 is included to delay the luminance signal information so that it will coincide timewise with the chroma information since signals of both types are applied to the tri-beam color picture tube 27. The luminance signal is coupled from the anode of the video amplifier tube 34 through the coupling capacitor 35 to the interconnected cathodes of the three electron guns in the picture tube 27. The potentiometer 36 is direct current connected to the cathodes of the tube 27, and it is variable to adjust the cathode bias and provide a brightness control.

The bandpass, or color IF, amplifier 40 amplifies the chroma modulation information which is in the form of modulation of a 3.58 megacycle suppressed subcarrier. The amplified and selected chroma modulation components are available in the coupling transformer 42. The amplifier 40 is also connected to the burst gate circuit 44. A gating signal at the horizontal deflection frequency is applied to the gate circuit 44 from the sweep system 22 so that the gate 44 will be responsive during the reference burst signal occuring with the horizontal synchronizing pulses of the received signal. Accordingly, transformer 48 will supply a reference signal which has the frequency and phase of the color reference burst in the received television signal.

The color demodulator system 50 includes a vacuum tube 54 which is a dual pentode with the cathode, the control grid, and the screen grid being common to both sections of the tube. The system performs the functions of demodulating the red and blue color difference signals, amplifying these color difference signals, oscillating at the frequency of the color subcarrier, and directly demodulating the green color difference signal. This oscillating demodulator system is therefore a self-oscillating, dual pentode, injection lock demodulator.

The cathode, control grid and screen grid of tube 54 are connected as an oscillator which is locked in phase by the 3.58 megacycle color reference signal applied thereto from transformer 48. The piezoelectric crystal 56 is connected between the secondary winding of transformer 48 and the control grid of tube 54, to act as a crystal filter for the incoming synchronizing signal. This crystal is also equivalent to a tunned circuit in the grid circuit of tube 54. The crystal is the highest Q oscillatory tank in the oscillator and will ring at a relatively high amplitude at a frequency of approximately 3.58 megacycles to cause the otherwise free running oscillator portion of the demodulator to follow in phase with the input burst reference signal. A capacitor 57 is connected from the primary winding of transformer 48 to the control grid of tube 54 in order to neutralize capacity coupling of the synchronizing signal through the crystal. This improves the stability of the signal applied to the control grid of the demodulator tube 54.

A grid leak resistor 60 is connected between the control grid of tube 54 and the cathode, while feedback coupling capacitor 62 is connected from the control grid to the top of the tuned circuit 64. The resonant circuit 64 includes a capacitor and variable inductor tuned to the reference frequency of 3.58 megacycles. A feedback tap of the inductor is connected to the cathode of tube 54. The damping resistor 66 is connected across the tuned circuit 64. A resistor 68 is connected from the bottom of the tuned circuit 64 to the parallel resistor-condenser combination 70 which is connected to ground. Accordingly cathode bias for the tube 54 is developed across the resistor 68, which is bypassed by means of the capacitor 72. The resistor-capacitor network 70 is selected in value to provide degeneration of low frequency signal energy to prevent noise streaking during monochrome signal reception when spurious signal energy might be introduced into the oscillator portion of the demodulator through the burst gate 44 and the crystal 56. The network 70 has sufficiently low impedance at the frequency of the chroma modulation components that essentially no degeneration takes place for these, but there is sufficient attenuation or degeneration of the average of spurious noise energy to prevent loss of picture image detail for a portion of a horizontal scan line, or even such loss for a period of several lines of horizontal scanning.

The screen grid of the tube 54 effectively forms the anode for the oscillator section of the multi-function vacuum tube. This grid is connected to a positive potential source through a network which will be explained in detain subsequently. The network connected to the screen grid includes a low pass filter and a load impedance for developing the green color difference signal. The screen grid is bypassed for signals at a frequency of 3.58 megacycles and is energized with a positive B+ potential so that in the electron stream through the screen grid of the tuned grid, tuned cathod oscillator there appears a color reference signal which is phased locked to the reference bursts in the received program signal.

The coupling transformer 42 furnishes chrominance information for the demodulator tube 54. The secondary winding **42*a* of transformer 42 is shunted by a capacitor 74 and is tuned substantially to 3.58 megacycles. The bottom terminal of the secondary winding 42*a* is bypassed to ground through a large bypass capacitor 76. A resistor 78 is connected from this terminal to the junction of resistor 68 and the network 70. Resistor 78 forms a direct current path from the bottom of the cathode bias resistor 68 in order to properly DC reference the color demodulator grids of the tube 54. Capacitor 76 is made large enough to bypass any of the low frequency energy components appearing at the top of network 70 which could otherwise cause undesired variations of the potentials of the third grids of the demodulator tube 54** during monochrome signal operation of the receiver.

The top terminal of the secondary winding **42*a* of the chroma transformer is coupled through a resistor 80 to the left hand or red demodulator grid of the tube 54. A capacitor 82 is also connected from this grid to the bottom side of the secondary winding 42*a*. The network 80, 82 forms a phase shift delay network for the chroma signal so that this signal appearing on the left hand or third grid of the tube 54** is delayed by a phase angle of 44°.

The right hand or blue grid of the tube 54 is connected to the top side of the secondary winding **42*a* through a capacitor 84. This blue demodulator grid is also coupled through a parallel combination of inductor 86 and resistor 88 to the bottom side of the secondary winding 42*a*. Accordingly the network 84, 86 and 88 forms a phase shift means to advance the phase of the chroma signal applied to the blue third grid of the demodulator tube 54** by a phase angle of 43.5°.

At the left and right anodes of the tube 54 there are available respectively the red and blue color difference signals. The operation of the demodulator to produce these signals in response to the phase shifted chroma signals on the third grids of the tube 54 is very much like the operation of two triode demodulators. The reference oscillator signal has the same phase for both demodulator sections and the two chroma signal components are displaced in phase with 87.5° between them. The current at either anode will vary as a function of the phase of the applied chroma signal in that section of the tube with respect to the phase of the oscillator signal. By this continual addition or subtraction from the color oscillator signal there will be an average change in the plate current to produce the $R-Y$ and $B-Y$ signals at the anodes.

Th network connected to the left hand or red anode of the demodulator tube 54 includes a trap 90 which is series resonant to remove the 3.58 megacycle signal from the demodulated signal components. A peaking coil 92 and associated damping resistor 94 are connected from the anode to the coupling capacitor 96. Capacitor 96 is connected to the red control grid in the tri-beam cathode ray tube 27. A resistor 98 is connected across the capacitor 96 to provide direct current coupling in the signal path of the color difference signal. The load impedance for the left anode of tube 54 is resistor 100 connected between B+ and the junction of the resistor 94 and capacitor 96. A frequency response shaping capacitor 102 is connected from the load resistor 100 to ground. The control grid of the red gun in the picture tube 27 is connected through an isolating resistor 104 to the arm of a potentiometer 106. Potentiometer 106 affords adjustment of the direct current bias on the red control grid of tube 27.

The network connected to the right hand or blue anode for the demodulator tube 54 is similar to the network connected to the left hand anode. The series resonant trap 110 is connected from the right hand anode to ground for bypassing signals of 3.58 megacycles. The peaking coil 112 is connected from the anode to the load resistor comprising resistors 114 and 115. Damping resistor 116 is connected across the peaking coil 112. Resistor 115 is connected to B+ to provide an energizing potential for the anode. Capacitor 120 is connected from the junction of coil 112 and resistor 114 to ground.

The interconnection of the load resistors 114 and 115 is fed through the coupling capacitor 122 to the control grid on the blue electron gun in the cathode ray tube. A resistor 124 is connected in shunt with the coupling capacitor 122 for direct current coupling purposes. An isolating resistor 126 is connected from the blue control grid of tube 27 to the arm of a potentiometer 130 for adjustment of the bias for the blue gun control grid.

A network similar to the described anode networks is also connected to the screen grid of the tube 54. There is a series resonant trap 134 connected from the screen grid to ground and a parallel connected peaking coil 136 and damping resistor 138 is also connected to the screen grid. The load impedance resistor 140 is connected from one side of peaking coil 136 to the B+ energizing potential for the screen grid. A capacitor 142 is connected from load resistor 140 to ground for modifying the frequency response of the screen network. The coupling capacitor 144 is connected from the load resistor 140 to the control grid of the green gun in the tri-beam cathode ray tube 27. A resistor 146 is connected in shunt with coupling capacitor 144 to provide direct current coupling through this circuit. The green control grid of the tube 27 is connected through an isolating resistor 148 to the arm of a potentiometer 150 which is variable for adjusting the bias on the control grid of the green gun on the picture tube.

The green color difference signal is produced at the screen grid of the tube 54 since the potential of this grid varies as a function of the phase reversed vector summation of the phase split chroma signals applied to the chroma grids of the tube 54. Thus, when the anodes of tube 54 are conducting a substantial amount of current in response to the phase split chroma signals, as they would be upon reception of a signal representing the green phase, the increased anode current will cause a drop in anode voltage as well as a decrease in the current of the screen grid and an increase in the voltage of the screen grid.

It should be noted that the swing of th $G-Y$ signal at the screen grid may be considerably less than the swings of the $R-Y$ and $B-Y$ signals at the anode of tube 54. However, a sufficient amplitude of the $G-Y$ signal can be produced in the described manner to provide entirely satisfactory drive of the cathode ray tube 27. One factor which tends to compensate for the reduced level of the $G-Y$ signal is the fact that this signal is normally transmitted at a much higher level in the received program signal than are either of the other two color difference signals. Furthermore, it can be seen that the entire voltage swing of the screen grid of tube 54 may be applied directly to the green gun of the cathode ray tube without attenuation in matrixing networks.

One of the important factors permitting operation in the above described manner for direct demodulation of the three color difference signals with production of the $G-Y$ signal effectively within the electron stream of the tube 54, is the proper selection of the phase shifting networks 80, 82 and 84, 86 and 88. The component values of each of these phase shifting networks permits the detection of the three color difference signals with the proper phase angles existing therebetween for direct drive of a picture tube. The red phase shifting network 80, 82 serves to delay the signal applied to the demodulator grid by a phase angle of 44°. Furthermore, the network 80, 82 must establish a proper amplitude of the signal at the demodulator grid. As previously described, the network 84, 86 and 88 is selected to cause the chroma signal applied to the blue demodulator grid to advance in phase by 43.5° and this network further applies a signal to the grid of preselected amplitude. Therefore, it may be seen that the two phase shifting networks can establish four particular factors for the signals applied to the modulator, namely the amplitudes and phases of the two chroma modulation components. As shown in FIG. 2, these networks are chosen so that the desired phase angles will exist among the three demodulated color difference signals, there labeled $R-Y$, $B-Y$ and $G-Y$, that is, the angles A, B and C are determined among these three signals at the output electrodes.

The stated adjustment of phase and amplitude of the chroma modulation components may provide three color difference signals having the proper phase as well as the proper amplitude for direct drive of a particular cathode ray tube. However, it may be found that due to the phosphor characteristics of the screen of the picture tube, or for other reasons, some amount of further correction of the demodulated chroma signal may be desirable. In this regard a balance improvement among the signals can be affected by dividing down one of the $R-Y$ or $B-Y$ signals to reduce its amplitude. As shown, the load impedance for the blue anode for the tube 54 comprises the resistors 114 and 115 connected in series. Since the $B-Y$ signal is derived at the junction of these two resistors, there will be a reduction in amplitude to lessen the drive of the blue gun in the picture tube. This permits establishing a proper relative amplitude among the color difference signals while still permitting full use of all the available $G-Y$ signal.

There is a still further effect available to provide additional correction for the color difference signals if this should be necessary in order to match the demodulated signals with a particular cathode ray tube. This is the cathode follower action provided in the cathode circuit of the picture tube itself. Since the cathodes of all three guns are connected together and the signal current for these is drawn through the load resistor 155 in the anode circuit of the video amplifier tube 34, a variation in the drive of one electron gun with respect to another will cause the second gun to be driven in reverse phase with respect to the first gun. Accordingly, as the $R-Y$ and $B-Y$ signals increase in amplitude to represent a green color difference signal there is a tendency in the circuit of the cathode ray tube to provide a net green color in the image due to the cathode follower action taking place. In fact, it is possible to produce some amount of green in the image of the tube by merely grounding the control grid of the green gun and inserting a sufficiently large series cathode resistor, labeled 157, in the common cathode path for the tube 27. (Resistor 157 could be 10,000 to 15,000 ohms and mounted very near the picture tube socket to reduce capacity from cathodes to ground, shunted by a small peaking capacitor, and resistor 155 could be 3,000 to 4,000 ohms, i.e., low enough to allow video peaking in the anode circuit of tube 34, such peaking circuitry not being shown.) However, such a cathode matrix may not provide enough cancelation of the red and blue information and it has the undesirable effect of reducing the video drive to the picture tube. In accordance with the basic system described herein, the $G-Y$ signal produced at the screen grid of tube 54 is additive green information sufficient to obviate the need for a large value cathode resistor such as resistor 157.

In the circuit of FIG. 1 there is a direct current tracking resistor 160 connected from the control grid of the green gun of tube 27 to the junction of coupling capacitor 122 and the load resistor 114. It has the function of direct current stabilizing the output of the demodulator circuit in order to minimize the direct current potential variations of the control grids as the local oscillator portion of tube 54 changes its level of operation. For example, as the reference burst signal is received with a color signal and the oscillator responds by operating at a higher level, the direct current potentials at the anodes of tube 54 may change in a manner different from the change in direct current potential at the screen grid of tube 54. This can introduce a net color change on the screen of the tube rather than maintaining the screen neutral in color. By direct current connecting one of the anodes in the modulator tube to the screen grid such as through resistor 160, these two electrodes will follow one another in direct current variation and in response to oscillator level changes to avoid image color changes due to presence or absence of synchronizing bursts.

Since there are phase split chroma signals on the two third grids of the tube 54, it is possible for some of this signal energy to be coupled through stray energy paths to the control grid to cause pulling or lack of synchronization of the oscillator, which must remain synchronized with the burst signal. These coupling paths are shown as capacitances 165 and 166 representing interelectrode capacitance and stray coupling paths among the wiring and socket parts for the tube 54.

In order to overcome this problem, a tertiary winding **42*b* is wound on top of the secondary winding 42*a* of the chroma coupling transformer in order to afford a very close coupling between the secondary and tertiary windings. One terminal of the winding 42*b* is connected to the bottom terminal of the secondary winding and the other terminal is connected through a capacitor 168 to the control grid of the tube 54. The chroma signal energy in the tertiary winding 42*b* is reversed in phase with respect to the chroma signal applied to the phase shift network 80, 82 and 84, 86 and 88. The value of capacitor 168 is selected to provide a phase and amplitude for the chroma signal available in the tertiary winding to counterbalance the vector sum of the chroma signal components coupled to the control grid through the capacitances 165, 166. In this way the stability of the oscillator is improved, particularly for reception of relatively weak television signals. With the tertiary winding 42*b*** closely coupled to the source of chroma signals for the demodulator, the counterbalancing signal will track the main signal in amplitude and phase so that the counter balancing action will operate properly throughout the operating range of the demodulator system.

A demodulator system constructed in accordance with the above described features may include components of the following values to provide fully practical operation:

| | |
|---|---|
| Tube **54** | 15LE8. |
| Resistor **60** | 47,000 ohms. |

| | |
|---|---|
| Capacitor **62** | 10 mmfd. |
| Resistor **66** | 6,800 ohms. |
| Resistor **68** | 56 ohms. |
| Network **70** | 1,000 ohms and and .01 mfd. |
| Capacitor **72** | .05 mfd. |
| Capacitor **76** | .15 mfd. |
| Resistor **78** | 10,000 ohms. |
| Resistor **80** | 2,200 ohms. |
| Capacitor **82** | 12 mmfd. |
| Capacitor **84** | 22 mmfd. |
| Coil **86** | 300 microhenries. |
| Resistor **88** | 2,200 ohms. |
| Resistor **100** | 22,000 ohms. |
| Capacitors **96**, **122**, **144** | .1 mfd. |
| Resistors **98**, **124** | 680,000 ohms. |
| Capacitors **102**, **120** | 5.6 mmfd. |
| Resistors **104**, **126**, **148** | 470,000 ohms. |
| Potentiometers **106**, **130**, **150** | 500,000 ohms. |
| Resistor **114** | 6,800 ohms. |
| Resistor **115** | 15,000 ohms. |
| Resistor **140** | 10,000 ohms. |
| Capacitor **142** | 680 mmfd. |
| Resistor **146** | 330,000 ohms. |
| Capacitor **168** | 1 mmfd. |

The single tube oscillating demodulator permits desirable oscillator sensitivity to pull in so that a good lock-in range is available. At the same time the single tube, preferably wtih the highest possible transconductance for the first grid, can still provide sensitivity for detecting chroma with enough amplitude for direct drive.

It may be noted that the operation of the tube 54 is such as to cause an increased apparent transconductance of the demodulator grids due to the signal appearing at the screen grid of the tube. As the applied chroma signal causes increased conduction of a section of the tube 54, the screen current will tend to decrease causing its potential to rise and further increase the anode current in the tube. Accordingly, the demodulator is able to provide an improved level of $R-Y$ and $B-Y$ signals due to the fact that the screen grid is used to directly develop the $G-Y$ signal. Furthermore, increased peak current is available in the tube for a given screen grid power dissipation which is a further practical advantage for the system.

Since each of the three color difference signals used to drive the color picture tube 27 are produced directly by the demodulator, the level of these signals can be less than would be necessary in a system where resistor matrixing were utilized to provide one or more of the color difference signals of proper phase. The described system effectively does away with mulitresistor matrixing and the losses attending such matrixes since the color difference signals having proper phase relationship with respect to one another are all produced directly by the demodulator tube due to the phases and amplitudes of the phase split chroma signals applied thereto. Thus, it may be seen that the demodulator system 50 tends to simplify and reduce the cost of the color television receiver.

I claim:

1. A demodulator system for a color television signal comprising chroma modulation components representing color difference signals in predetermined phase relation with respect to one another and associated respectively with red, blue and green in a television image, and a color reference burst signal representing the carrier for the modulation components, said demodulator system being operative to directly demodulate each of the color difference signals representing the red, blue and green information for direct application to a cathode ray tube and including in combination, a demodulator tube having a cathode, a common control grid, a common screen grid, first and second further control grids, and first and second anodes, said first further control grid and said first anode establishing a first electron current path from said cathode and through said common control and common screen grids exclusive of a second electron current path from said cathode and through said common control and common screen grids in which said second further control grids and said second anode are operative, said screen grid being at the same direct current and signal potential in both of said current paths, oscillator circuit means including means turned to provide demodulating oscillations phase locked to the color reference burst signal, band pass circuit means for selecting the chroma modulation components, coupling circuit means connected from said band pass circuit means and said oscillator circuit means to said common control grid and said first and second further control grids for supplying the chroma modulation components and the demodulating oscillations at selected phases and amplitudes in said first and second current paths, first, second and third detector loads circuits individually coupling said anodes and said common screen grid to the cathode ray tube and each including bypass means for the edmodulating oscillations so that said load circuits respectively develop color difference signals representing red, blue and green colors of the image, said load circuit coupled to said common screen grid having substantially no series impedance thereby applying unattenuated signals therefrom to the cathode ray tube, said coupling circuit means including a phase shifting circuit at at least one of said first and second further control grids for establishing the phase and amplitude of signals on such grids for directly demodulating the red and blue representative signals individually at said anodes and the green representative signal at said screen grid.

2. The demodulator system of claim 1 further including resistance means direct current coupled between said common screen grid and one of said anodes for direct current tracking between signals developed in said detector load circuits.

3. The demodulator system of claim 1 in which said coupling circuit means connects said oscillator circuit means to said cathode and common control grid to form an oscillator therewith, and said phase shifting circuit includes portions coupled from each of said first and second further control grids to said bandpass circuit means.

References Cited

UNITED STATES PATENTS

| | | | |
|---|---|---|---|
| 2,764,643 | 9/1956 | Sulzer | 331—183 |
| 2,848,529 | 8/1958 | Werenfels | 178—5.4 |
| 2,877,294 | 3/1959 | Hinsdale | 178—5.4 |
| 2,990,445 | 6/1961 | Preisig | 178—5.4 |
| 3,023,271 | 2/1962 | Hansen | 178—5.4 |

ROBERT L. GRIFFIN, *Primary Examiner.*

R. MURRAY, *Assistant Examiner.*